United States Patent
Ek et al.

(10) Patent No.: US 6,325,959 B1
(45) Date of Patent: *Dec. 4, 2001

(54) USE OF CROSS-LINKED POLYOLEFINS MATERIAL IN PRESSURE PIPES

(75) Inventors: Carl-Gustaf Ek, Västra Frölunda; Lars Höjer, Ytterby, both of (SE)

(73) Assignee: Borealis A/S, Lygby (DK)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,481
(22) PCT Filed: Nov. 19, 1996
(86) PCT No.: PCT/SE96/01493
§ 371 Date: Sep. 4, 1998
§ 102(e) Date: Sep. 4, 1998
(87) PCT Pub. No.: WO97/19807
PCT Pub. Date: Jun. 5, 1997

(30) Foreign Application Priority Data

Nov. 30, 1995 (SE) ................................... 9504273

(51) Int. Cl.[7] .............. D01D 5/24; B29C 71/00; B29C 55/00; B29D 22/00; F16L 55/04
(52) U.S. Cl. .................. 264/209.5; 264/290.2; 264/209.6; 264/236; 428/36.91; 138/26
(58) Field of Search ................. 428/36.91, 521, 428/516, 517; 138/26, 32, 141, 142; 264/464, 470, 471, 462, 457, 458, 290.2, 209.5, 209.6, 236

(56) References Cited

U.S. PATENT DOCUMENTS

| 3,265,790 | 8/1966 | Kirk et al. ........................ 264/95 |
| 4,064,296 | 12/1977 | Bornstein et al. ............... 428/35 |

FOREIGN PATENT DOCUMENTS

| 2 051 309 | 4/1972 | (DE) . |
| 57-107821A * | 7/1982 | (JP) . |
| WO 84/01988 | 5/1984 | (WO) . |
| WO84/01920 | 5/1984 | (WO) . |
| WO 89/07077 | 8/1989 | (WO) . |
| WO 93/19924 | 10/1993 | (WO) . |
| WO97/10941 | 3/1997 | (WO) . |

OTHER PUBLICATIONS

Derwent Abstract of JP 57–107,821 A; Hayashi, Toru; Polyethylene Pipe Production, Jul. 1982.*
EPO search report dated Oct. 12, 1999 for application No. 96 941 246.9–2307.
W.E. Gloor, Why Biaxially, Oriented Pipe?; Modern Plastics, Nov. 1960; pp. 111–114, 212–214.
Dr. K. Richard et al., Strengthened Pipes from Ziegler Polythene, Plastics, Dec. 1961, pp. 111–114.

* cited by examiner

Primary Examiner—Rena L. Dye
Assistant Examiner—Michael C. Miggins
(74) Attorney, Agent, or Firm—Merchant & Gould P.C.

(57) ABSTRACT

Use of at least partly cross-linked polyolefin plastic, which is oriented biaxially, as material for pressure pipes, is described. The pressure pipe is produced by extrusion with subsequent axial and peripheral orientation of the pipe, the pipe being at least partly cross-linked before the biaxial orientation. Preferably, the pipe is cross-linked to about 20–50% before orientation. By the at least partial cross-linking before orientation, this can be carried out at temperatures above the crystalline melting point of the plastic material.

7 Claims, 2 Drawing Sheets

USE OF CROSS-LINKED POLYOLEFINS MATERIAL IN PRESSURE PIPES

Figure 1:
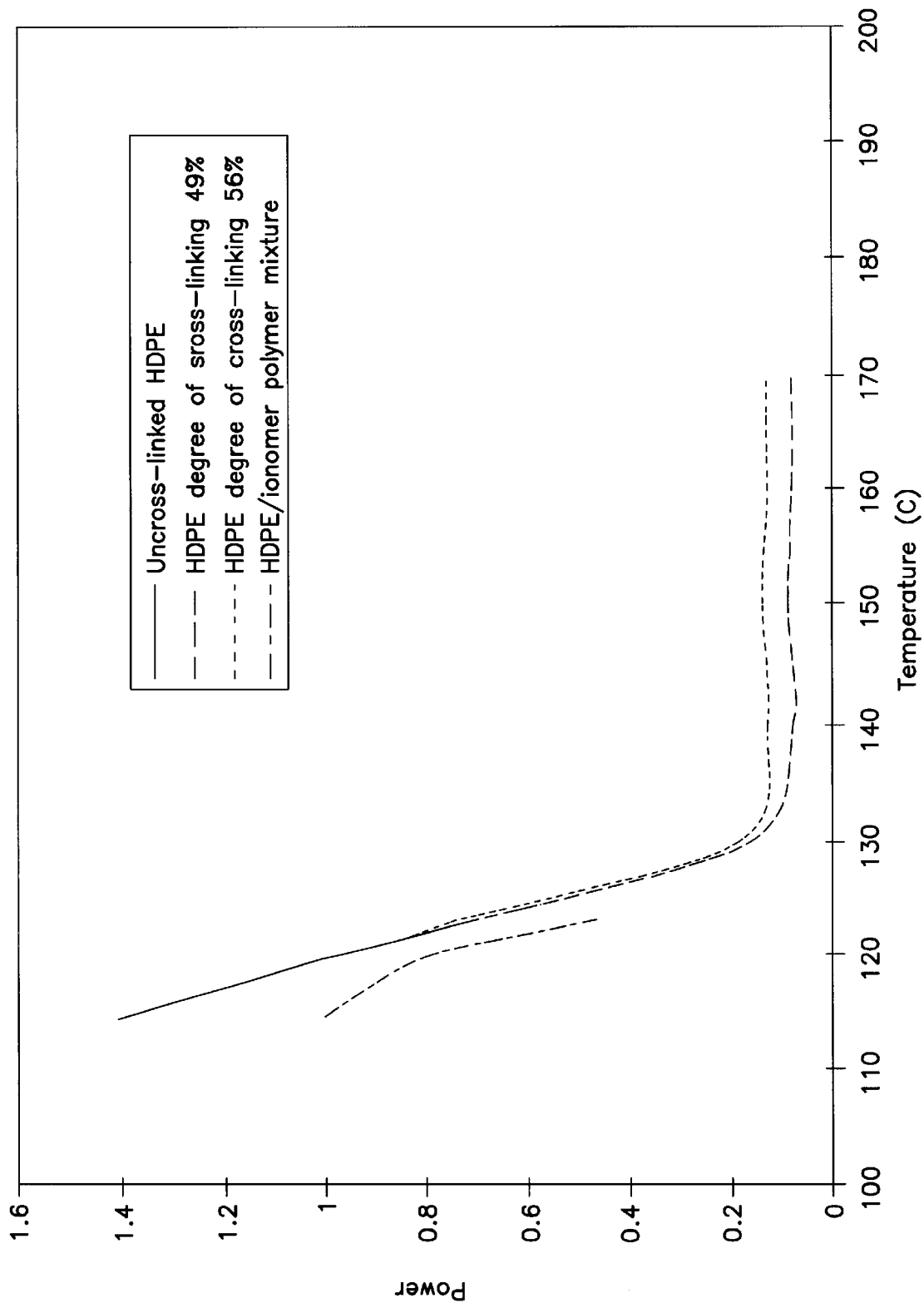

The present invention relates to use of at least partly cross-linked, biaxially oriented polyolefin plastic as material for pressure pipes.

By pressure pipe is meant a pipe which, when used, is subjected to a positive pressure, i.e. the pressure inside or outside the pipe is higher than the pressure outside and inside the pipe, respectively.

Nowadays, pipes of polymer material are frequently used for various purposes, such as fluid transport, i.e. transport of liquid or gas, e.g. water or natural gas, during which the fluid can be pressurised. Moreover, the transported fluid may have varying temperatures, usually not outside the temperature range from about −40° C. to about 100° C. Such pipes are now preferably made of polyolefin plastic, such as ethylene plastic (HDPE, MDPE), or of polyvinyl chloride (PVC) or alternatively of other materials that are not necessarily based on polymer.

It is known that the physical and mechanical properties of many polymer materials can be improved by orienting the material and its structure. It is also known that the properties which by orientation are improved in the direction of orientation in most cases become lower in a direction perpendicular to the direction of orientation, in many cases on the same level as the properties of an unoriented material or worse. In many cases, it is not satisfactory to have so different properties in two different directions, and a biaxial orientation of the material may then be applied. The biaxial orientation means that the polymer material is oriented in two directions, perpendicular to one another. By this technique, the physical and mechanical material properties can thus be adapted in the two main directions in dependence on load, requirements as to function, pipe manufacturing process etc.

For a pipe construction of the type involved having an internal positive pressure, the load in the pipe wall is, in the normal case, greatest in the circumferential or peripheral direction and lower in the axial direction.

In conventional manufacture of plastic pipes by extrusion, preferably a uniaxial orientation of the polymer material is obtained in the axial direction of the pipe owing to the shear, elongation etc., to which the molten mass of polymer is subjected on its way from the extruder, through the nozzle and by calibration and cooling to a ready-formed pipe in solid state.

Thus, pipes manufactured by conventional extrusion usually have better physical and mechanical properties in the axial direction of the pipe compared with its peripheral direction, at the same time as the load or tension in the pipe wall is greater in the peripheral direction than in the axial direction.

The properties of such conventional plastic pipes are quite sufficient for many purposes, but not satisfactory in some cases, for instance in applications requiring high pressure resistance, i.e. pipes that are subjected to an internal fluid pressure for a long and/or short period. For such pipes, improved compressive strength is desired.

With a view to reducing the restrictions with pressurised plastic pipes, it is known that the physical and mechanical properties can be improved by biaxial orientation of the pipe, i.e. the polymer material in the pipe is oriented in two directions which are perpendicular to one another. One of these two directions is the axial direction of orientation, i.e. the direction (direction of extrusion) in which the pipe is manufactured in the normal case, whereas the other direction is the circumferential or peripheral direction of the pipe. Thanks to biaxial orientation, a plurality of the properties of the pipe can be improved to a considerable extent, and especially the compressive strength, both for shorter and longer periods, should be mentioned.

The improved compressive strength means that with corresponding dimensions of the pipe material, it is possible to subject the pipe to higher internal pressure compared with a pipe that is not biaxally oriented. Alternatively, it is possible to use, with the same pressurisation, a smaller thickness of material in a biaxially oriented plastic pipe.

Other mechanical properties that can be improved by orientation is, for instance, rigidity (modulus of elasticity), strength (tensile strength) as well as impact toughness. Increased rigidity and strength result in improvement of the short-term strength of the material. The improved impact toughness means that the pipe is less sensitive to external influence in the form of impacts, i.e. the handling of the pipe is rendered more easy. Improvements of properties can also be achieved, for instance, in the form of improved chemical resistance, improved weather resistance and lower coefficient of thermal expansion.

As examples of known methods for biaxial orientation of plastic pipes, reference can be made to an article by W. E. Gloor, "Why biaxially oriented pipe?", Modern Plastics, November 1960, pp. 111–114, 212, 214, an article by K. Richard, G Diedrich and E. Gaube, "Strengthened pipes from Ziegler Polythene", Plastics, December 1961, pp. 111–114, and PCT Application WO 93/19924.

As mentioned above, plastic pipes are generally manufactured by extrusion, or, to a smaller extent, by injection moulding. A conventional plant for extrusion of plastic pipes comprises an extruder, a nozzle, a calibrating device, cooling equipment, a pulling device, and a device for cutting or for coiling-up the pipe. By the molten mass of polymer on its way from the extruder through the nozzle and up to calibration, cooling and finished pipe being subjected to shear and elongation etc. in the axial direction of the pipe, an essentially uniaxial orientation of the pipe in its axial direction will be obtained. A further reason that contributes to the orientation of the polymer material in the direction of material flow is that the pipe can be subjected to tension in connection with the manufacture.

To achieve biaxial orientation, the above-described plant can be supplemented, downstream of the pulling device, with a device for temperature control of the pipe to a temperature that is suitable for biaxial orientation of the pipe, an orienting device, a calibrating device, a cooling device, and a pulling device which supplies the biaxially oriented pipe to a cutting device or coiler.

The biaxial orientation can also be carried out in direct connection with the first calibration after extrusion, in which case the above-described supplementary equipment succeeds the first calibrating device.

The biaxial orientation of the pipe can be carried out in various ways, for instance mechanically by means of an internal mandrel, or by an internal pressurised fluid, such as air or water or the like. A further method is the orienting of the pipe by means of rollers, for instance by arranging the pipe on a mandrel and rotating the mandrel and the pipe relative to one or more pressure rollers engaging the pipe, or via internally arranged pressure rollers that are rotated relative to the pipe against an externally arranged mould or calibrating device.

To sum up, there are several prior art methods for biaxial orientation of plastic pipes, and all these methods can be used in the present invention.

For all prior art methods for biaxial orientation of crystalline and uncross-linked plastic materials, such as polyolefin plastic, the orientation must be carried out within a given, restricted temperature range, and the pipe must be cooled within a limited period of time to prevent the material from quickly returning to an unoriented state (relaxation). Moreover, the requirements for temperature accuracy in the pipe/pipe wall are great in order to obtain a uniform orientation both along the pipe and in the peripheral direction of the pipe, and to obtain satisfactory dimensional tolerances for the final product.

The upper limit of the restricted temperature range at which the process can be performed is determined by the crystalline melting point ($T_m$) of the material, which for instance for HDPE is about 128–135° C. Orientation above this temperature normally causes no increased strength of the material and is usually of no value.

The lower limit of the temperature range is determined by the properties of the plastic material when subjected to a deformation procedure, which occurs, for instance, in conventional tensile testing of plastic materials. When, for instance, polyethylene is subjected to tensile stress in this manner at low temperatures, in the order of room temperature (about 20° C.), the stress-strain curve has a marked maximum even at a low elongation of about 5–20% (see the above-mentioned literature references).

For the case where the orientation procedure of a pipe takes place by utilising an inflation technique with pressurised internal fluid, this means that if a certain tensile stress is exceeded, there occurs a transition from a homogeneous deformation of the material to a local plasticising (flow) of the material involving necking, a locally thinned wall and a behaviour where the pipe is locally inflated like a balloon, either along the entire circumference of the pipe or very locally like a blister in the pipe wall as the visual result. The same also applies at higher temperatures, but the marked maximum of the stress-strain curve decreases more and more with increasing temperature so as to finally disappear completely at a temperature just below the crystalline melting point. When the maximum of the stress-strain curve has disappeared, also the local plasticising is eliminated, and the pipe can expand in an even and uniform manner for accomplishing a biaxial orientation. For other types of orientation procedures which are useable for pipe constructions, temperature and material effects of the equivalent type usually arise, with a local or, alternatively, uniform deformation behaviour.

When orienting by means of drawing over a mandrel, the lower limit of the temperature range is in the normal case determined by the fact that the force that is necessary for the drawing is far too great, and that the pipe relaxes after drawing.

Experiments have shown that the temperature range which is restricted by the risk of the local plasticising behaviour of the material on one hand and the crystalline melting point of the material on the other hand, and within which temperature range the material can be oriented biaxially, is very narrow and lies between the crystalline melting point ($T_m$) and about 10° C. below that. In practice, the temperature range can be still narrower and, for instance, in the order of one or a few degrees centigrade. To achieve a uniform orientation as mentioned above and satisfactory dimensional tolerances, also the differences in temperature of the pipe material involved should not exceed in the order of one or alternatively a few degrees centigrade.

It will be appreciated that it is difficult in actual practice to control the temperature of the plastic materials so exactly that it lies in the narrow temperature range, within which biaxial orientation is possible, and also so uniformly that the entire plastic material has the same temperature. Such a precise temperature control requires complicated and expensive temperature control equipment for adjusting the temperature of the pipe to the desired value.

Since plastic as a rule has poor thermal conductivity, and plastic pipes frequently have a relatively great wall thickness, which in many cases amounts to about 1/10 of the pipe diameter or more, i.e. about 25 mm or more at a diameter of 250 mm, the above-mentioned, accurate temperature controlling process requires considerable time, which results in a time-consuming process and a low production speed.

The tension that is required in the pipe wall for achieving the orientation usually has a strong temperature dependence in polyolefin plastics, which, according to the method of orientation, can also result in more complicated and expensive equipment for force/tension control.

A further drawback in the context is that, when the temperature of the pipe has once been adjusted to the correct value and the biaxial orientation has been effected, the temperature of the pipe must be lowered at such a speed as to prevent or minimise a relaxation of the biaxial orientation, i.e. basically as quickly as possible. The demands for a high speed of temperature decrease are thus greater at temperatures close to the orientation temperature than at lower temperatures. With a view to maintaining the orientation, it may for instance be necessary to use rapid cooling processes which utilise direct contact with a cooling agent of the fluid nitrogen type or the like. It may also be necessary to use both internal and external cooling. With regard to the above-mentioned poor thermal conductivity of plastic materials, it may be difficult in practice to achieve such rapid cooling of the plastic pipe as to maintain the orientation to a sufficient extent.

All the above-mentioned drawbacks and limitations mean that a biaxial or peripheral orientation can only take place within narrow process conditions, by using expensive production equipment and at a low production rate, which has resulted in the method not becoming commercially interesting on a large scale.

The object of the present invention is to reduce or eliminate the above-described drawbacks of pressure pipes made of polyolefin plastic. According to the invention, this is achieved by the pipe being oriented in the axial and peripheral direction, the polyolefin plastic of the pipe being at least partly cross-linked before the peripheral orientation.

The further features of the invention are apparent from the appended claims.

It should be mentioned in this context that it is known, in a completely different field of the technique, to produce a so-called shrink film and a heat-shrinkable sleeve; see e.g. WO 89/07077 and U.S. Pat. No. 3,265,790. When producing shrink film, the film is stretched for biaxial orientation, and before that the film has been cross-linked to give the film a "mechanical memory", i.e. to make the film, when heated above the orientation temperature, shrink and return to its original size.

There is a fundamental difference between the invention and shrink film owing to the fact that while the actual purpose of shrink film is as extensive return or shrinkage as possible when later re-heating the film, no return or shrinkage at all is desired according to the invention, but instead an improvement of the pressure resistance. This is also obvious from the fact that according to the invention, it is possible to carry out an subsequent cross-linking in order to "lock" the structure. Such subsequent cross-linking is excluded in a shrink film, since this counteracts the desired shrinkage. There being an essential difference between shrink film and the present invention is also apparent from the fact that although shrink film has been known and used for a very long time, it has not been possible to overcome the above-described drawbacks in biaxial orientation of plastic pressure pipes. Even if there may thus be similarities between the shrink film technique and the invention in respect of the steps involving cross-linking and biaxial orientation, there is no further similarity. Above all, it is not previously known to use the technique of cross-linking and biaxial orientation when manufacturing pressure pipes of plastic. It should be emphasised that the invention eliminates an old and very inconvenient problem in the manufacture of pressure pipes of plastic and involves great progress in the art.

By using in the biaxial orientation a partly cross-linked polyolefin plastic, the temperature for the peripheral orientation is limited not by the crystalline melting point ($T_m$) of the material, but also higher temperatures can be used to carry out the orientation. The condition that the temperature range for carrying out the biaxial orientation according to the invention is considerably extended in relation to prior art means a great advantage since at the higher temperatures, less force is necessary to orient the material, i.e. less complicated equipment can be used and the cost for the orientation will be lower. Moreover, the adjustment of the temperature of the plastic material for the orientation procedure need not be as accurate as in prior art technique. This is due to the forces required for the orientation procedure being less temperature-dependent if the degree of cross-linking and temperature levels are selected in a suitable fashion and thus the orientation takes place uniformly in the pipe construction, which means that the orientation can be made more rapid and simpler while using less complicated and less expensive equipment. Owing to the cross-linking of the material, which contributes to a locking of the structure, the subsequent cooling after the biaxial orientation can also be made less critical than in prior art technique. This means that the subsequent cooling of the material need not be as rapid as before, which in turn implies that the cooling can be made simpler and thus less expensive.

As mentioned above, the present invention is limited to polyolefin plastic. By this is meant homopolymers of olefins, preferably alpha-olefins, or copolymers thereof having at least one further, copolymerisable ethylenically unsaturated monomer. By copolymers are thus meant also polymers which in addition to ethylene contain two (terpolymers) or several other comonomers. By polyolefin plastic is also meant polymer mixtures, in which the major part, i.e. at least 50% by weight, consists of polyolefin plastic, while the remainder of the polymer mixture consists of another polymer, such as a thermoplastic material. The polyolefin plastic is preferably selected among ethylene plastic, i.e. plastic based on polyethylene or on copolymers of ethylene, in which the ethylene monomer constitutes the greatest part of the mass; propylene plastic, and butene plastic (said plastics being defined in a manner corresponding to that of ethylene plastic). The currently most preferred polyolefin plastic is ethylene plastic and, in particular, ethylene plastic of the MDPE and HDPE type. Such plastics are per se known, and neither they nor their manufacture constitute part of the present invention.

It is also per se known to cross-link polyolefin plastics, such as ethylene plastic. Such cross-linking can be accomplished in various ways, such as radiation cross-linking, peroxide cross-linking, cross-linking with cross-linkable groups, ionomer cross-linking, or combinations of such procedures. In radiation cross-linking, the cross-linking takes place by the plastic being irradiated with high-energy radiation, such as electron radiation, while in peroxide cross-linking, the cross-linking takes place by the addition of peroxide compounds, such as dicumyl peroxide, which form free radicals. In cross-linking with cross-linkable groups, reactive groups are inserted in the plastic, said groups reacting with each other while developing covalent bonds. A special example of such reactive groups is silane groups, which are inserted in the plastic by graft polymerisation or, preferably, copolymerisation and, in the presence of water and a silanol condensation catalyst, are hydrolysed while separating alcohol and forming silanol groups, which then react with each other by a condensation reaction while separating water. In ionomer cross-linking, the plastic contains ionisable groups, which react with polyvalent, ionic cross-linking reagents while developing ionic bonds.

The invention is not limited to a special type of cross-linking, but any suitable process which results in cross-linking of the polyolefin plastic can be used.

According to the invention, it is important that the plastic pipe is at least partly cross-linked before the biaxial orientation is effected. If the pipe is not cross-linked when the biaxial orientation is performed, this must take place under the same conditions as in prior art, i.e. within the narrow temperature range as indicated above, and no advantages of the invention would be achieved. If, on the other hand, the pipe is cross-linked in the orientation, the cross-linking contributes to the structure of the material that otherwise is maintained by above all the crystals of the material. Owing to the cross-linking, the crystalline melting point of the material thus no longer constitutes a critical upper limit of the orientation, but the orientation can be carried out at temperatures above the crystalline melting point. This means that the temperature range is extended upwards, which results in easier temperature control of the orientation procedure, and also that the material is able to offer less resistance to the orientation, i.e. less force is required for the orientation. The cross-linking also counteracts the local deformation behaviour as mentioned above, exemplified as necking and local inflation of the pipe in an orientation procedure based on internal fluid pressure, at temperatures below the crystalline melting point, thereby extending the temperature range downwards as well. The cross-linking also makes the requirements for accurate temperature control decrease on the one hand above the crystalline melting point when the force required for the orientation procedure usually has a smaller temperature dependence and, on the other hand, below the crystalline melting point when the local plasticising and deformation behaviour as mentioned above is suppressed.

The extension of the temperature range, i.e. the increase in temperature above the crystalline melting point and the decrease in temperature below the crystalline melting point, which is possible in the orientation depends on the cross-linking of the plastic material. The extension of the temperature range increases with an increased degree of cross-linking up to the melting point of the cross-linked plastic material, while the extension of the temperature range above that is relatively independent of the degree of cross-linking provided that the degree of cross-linking has exceeded a specific level which is dependent on the type of material, the technique of cross-linking etc. The degree of cross-linking is defined as the portion of insoluble material in the plastic material (excluding filler, if any) measured by extraction with decahydronapthalene according to the ASTM D 2765 method, except that the extraction with decahydronaphthalene after 6 h is continued one more hour in pure, boiling decahydronaphthalene. Basically, the plastic material can be cross-linked to the highest possible degree of cross-linking of the material during the orientation, but this may imply that the material becomes more brittle (lower elongation at break) or that it possibly affords undesired high resistance to the orientation. Thus, it is necessary that the material has a certain minimum elongation at break to make it possible to orient the material to the desired level. For this and other reasons, it is preferred that the plastic material is only partly cross-linked in the orientation.

A suitable degree of orientation, by which is meant the elongation deformation (elongation/original length), in the peripheral direction, for achieving relevant improvements of properties for pipe applications, is preferably about 25–300%, more preferred 50–200%, and most preferred 75–150%. Therefore the material should have an elongation at break at the temperature of orientation which is at least equal to the selected degree of orientation. In the axial direction, the same degree of orientation is normally not required since the load owing to an internal positive pressure is normally lower in the axial direction of the pipe. The axial level of orientation thus is determined in such manner that the physical and mechanical properties in the axial direction are not limiting compared with the reinforcement in the peripheral direction, taking the current case of load and the type of orienting process into consideration.

Before orientation, the plastic material suitably has a degree of cross-linking of at least about 10% and also suitably a degree of cross-linking of at most about 90%. In this range, i.e. about 10–90%, preferably about 20–50% degree of cross-linking, a suitable degree of cross-linking is selected on the one hand on the basis of the appearance of the stress-strain curve in the peripheral direction and, if applicable, in the axial direction, thereby avoiding a marked maximum and, on the other hand, so as to obtain an elongation at break which is sufficient for the orientation procedure.

When the plastic pipe has been oriented biaxially, the biaxially oriented structure is "locked" by cooling the pipe. Since the cross-linking contributes to the locking of the structure, the cooling need not be as rapid as according to prior art technique after orienting under equivalent conditions. Thus, the cooling according to the invention can be varied from quick cooling, for instance by means of a flow of compressed air and water spray, to natural cooling in air without the different cooling procedures resulting in any noticeable differences in terms of reinforcement of the material. In order to obtain a reinforcement of the pipe, it is assumed that the biaxally oriented pipe is prevented from returning completely to the state existing before the orientation procedure. For additional locking of the structure and counteracting any risk of relaxation of the orientation, for instance when heating the plastic pipe, it is especially preferred according to the invention to cross-link the pipe additionally after the biaxial orientation. As a rule, the subsequent cross-linking can proceed to the maximum degree of cross-linking of the material involved. Preferably, the subsequent cross-linking results in the pipe being cross-linked to at least the degree of cross-linking stated in DIN 16 892, i.e. for peroxide-cross-linked pipes 75%, for silane-cross-linked pipes 65%, for radiation-cross-linked pipes 60%, and for azo-cross-linked pipes 60%.

The cross-linking of the plastic pipe thus is begun before the biaxial orientation and suitably after the extrusion of the pipe, preferably immediately before the peripheral orientation. A cross-linking station for accomplishing cross-linking in one of the ways previously described thus is arranged between the extruder and the device for peripheral orientation of the pipe. If subsequent cross-linking of the pipe is carried out in order to achieve additional locking of the structure, as is especially preferred in the invention, a subsequent cross-linking station is arranged after the device for peripheral orientation of the pipe and preferably after, or in connection with, the subsequent cooling device.

It is emphasised that the cross-linking can also be carried out as a continuous process, in which case the cross-linking is begun before the orientation of the pipe and continues during the actual orientation procedure so as to be completed only after completing the orientation.

It should be mentioned in the context that the inventive method can be carried out as a discontinuous or batchwise method, but preferably is carried out as a continuous method.

The above stated extension of the temperature range in the biaxial orientation according to the invention is, as mentioned above, dependent on the degree of cross-linking of the plastic material. The biaxial orientation temperature in the invention generally amounts to about 20° C. below, and about 40° C. or more above the crystalline melting point (Tm) of the material. Preferably, the orientation in the invention is carried out within a temperature range of from about 15° C. below Tm and up to about 30° above Tm, more preferred from about 10° C. below Tm and up to about 20° C. above Tm, and most preferred from about 5° C. below Tm and up to about 10° C. above Tm. Orientation at temperatures above Tm, i.e. about 0–40° C., preferably about 0–30° C., more preferred about 0–20° C., and most preferred about 0–10° C. above Tm, constitutes a special aspect of the present invention.

In the above description of the invention it has been assumed that the plastic pipe homogeneous, i.e. in its entirety consists of one and the same material. However, it is also possible to apply the invention 1) to composite pipes, i.e. pipes having a multilayer composition and consisting of two or more layers of different plastic materials, at least one of the layers being partly cross-linked polyolefin plastic as stated above, and 2) to pipes made of a mixed material, in which the main part of the material is polyolefin plastic, or alternatively 3) to combinations of 1) and 2).

With a view to further facilitating the understanding of the invention, some Examples follow below, in which all parts relate to weight, unless otherwise stated. It will be appreciated that the Examples are merely intended to elucidate tha invention and not to restrict the scope thereof in any way whatever.

EXAMPLES AND DESCRIPTIONS OF THE DRAWINGS

Example 1

Pipes having an outer diameter of 63 mm and a wall thickness of 12.3 mm were produced in conventional manner from high-density polyethylene (HDPE, density 940–950 kg/m$^3$) by means of an extruder. By utilising various, known cross-linking methods, the pipes were cross-linked to a different degree of cross-linking, which was determined according to the modified ASTM method D2765, as stated above. The different cross-linking methods are defined in more detail in conjunction with Table 1. After cross-linking, the pipes were oriented biaxially at 140° C. by an inflation procedure in the following manner: each pipe was mounted in one fixed and one movable pipe coupling. The pipe was inflated by means of an internal positive pressure against an external supporting pipe of metal. This resulted in peripheral orientation. At the same time, the movable coupling was fed away from the fixed pipe coupling, thereby increasing the length of the pipe. After a certain distance, the movable pipe coupling was stopped. This resulted in both peripheral and axial orientation of the pipe. Immediately after orientation, compressed air of room temperature (25° C.) was flushed through the pipe, and an aqueous mist having a temperature of 10° C. was sprayed over the external supporting pipe. The degree of orientation in the peripheral direction of the pipe was 107% and the degree of orientation in the axial direction of the pipe was 18%. The resulting improvement of strength was analysed by tensile testing at 23° C. in the peripheral direction of the pipe (testing method ASTM D2290) and in the axial direction of the pipe (testing method ISO 527-2). The resulting maximum stress on the tensile test curve was noted and the improvement of strength in relation to unoriented state was calculated. The results are stated in Table 1.

TABLE 1

| Material | Cross-linking process | Degree of cross-linking (%) | Resulting improvement of strength | |
|---|---|---|---|---|
| | | | Peripherally (%) | Longitudinally (%) |
| HDPE | 0.3% silane (1) | 38 | 15 | −1 |
| HDPE | 0.4% silane (1) | 50 | 55 | 13 |
| HDPE | 0.23% peroxide (2) | 30 | 22 | 0 |
| HDPE | 0.27% peroxide (2) | 42 | 35 | 8 |
| HDPE | 0.35% peroxide (2) | 60 | 108 | 25 |
| HDPE | 50 kGy radiation (3) | 37 | 18 | −3 |
| HDPE | 75 kGy radiation (3) | 42 | 37 | 5 |
| HDPE | 105 kGy radiation (3) | 49 | 45 | 10 |
| HDPE | 210 kGy radiation (3) | 56 | 132 | 27 |

(1) The silane cross-linking and its different degrees of cross-linking were obtained by grafting different amounts of vinyl trimethoxy silane, VTMS, on the material before extrusion. After extrusion, the pipes were cross-linked in a water bath.

(2) The peroxide cross-linking and its different degrees of cross-linking were obtained by adding to the material different amounts of dicumyl peroxide before extrusion. After extrusion, the pipes were cross-linked in a furnace.

(3) The radiation cross-linking and its various degrees of cross-linking were obtained by irradiating the pipes with different doses of beta radiation after extrusion.

Example 2

Pipes having an outer diameter of 32 mm and a wall thickness of 5 mm were produced in a manner equivalent to Example 1, but by using an HDPE/ionomer polymer mixture (70% by weight HDPE, density 945 kg/m$^3$ and 30% by weight ethylene methacrylic acid ionomer, density 930 kg/m$^3$). The pipes were oriented biaxially in the same way as in Example 1, the orientation in the peripheral direction being 90% and the orientation in the axial direction being 20%. The improvement of strength was analysed by tensile testing at 23° C. in the same way as in Example 1 and was measured in the peripheral direction to be 35 % and in the axial direction to be 6%.

Example 3

Test samples of four different pipe materials were examined in respect of power demand in the orientation at different temperatures. The test samples were obtained from the following pipe materials:

1) Test sample of a pipe of uncross-linked HDPE (density 945 kg/m$^3$) having an outer diameter of 63 mm and a wall thickness of 12.3 mm.

2) Test sample of a pipe of radiation-cross-linked HDPE having a degree of cross-linking of 49%, measured according to the above-mentioned, modified ASTM method D2765. The outer diameter of the pipe was 63 mm and the wall thickness 12.3 mm.

3) Test sample of a pipe of radiation-cross-linked HDPE having a degree of cross-linking of 56%, measured according to the above-mentioned, modified ASTM method D2765. The outer diameter of the pipe was 63 mm and the wall thickness 12.3 mm.

4) Test sample of a pipe of HDPE/ionomer polymer mixture 70% by weight HDPE, density 945 kg/m$^3$, and 30% by weight ethylene methacrylic acid ionomer, density 930 kg/m$^3$). The outer diameter of the pipe was 63 mm and the wall thickness was 12.3 mm.

The test samples were oriented unaxially by using a tensile testing apparatus and the power demand as a function of the orientation temperature at an orienting speed of about 0.01 s$^{-1}$ was recorded. FIG. 1 represents the result in the form of the maximum power as a function of the orientation temperature that was noted up to 100% elongation. It should be mentioned that the power scale has been normalised with respect to the properties of the uncross-linked material at 120° C., i.e. under these conditions, the power is set to be 1. As appears from FIG. 1, it is possible in cross-linked polymer materials according to the invention to orient the material at higher temperatures than are possible in uncross-linked materials, and the orientation can besides take place by using a smaller amount of power. As is also evident from FIG. 1, only the cross-linking of the polymer material affects, at a specific deformation speed, the power demand when orienting above the crystalline melting point of the polymer material.

Example 4

Figure 2:
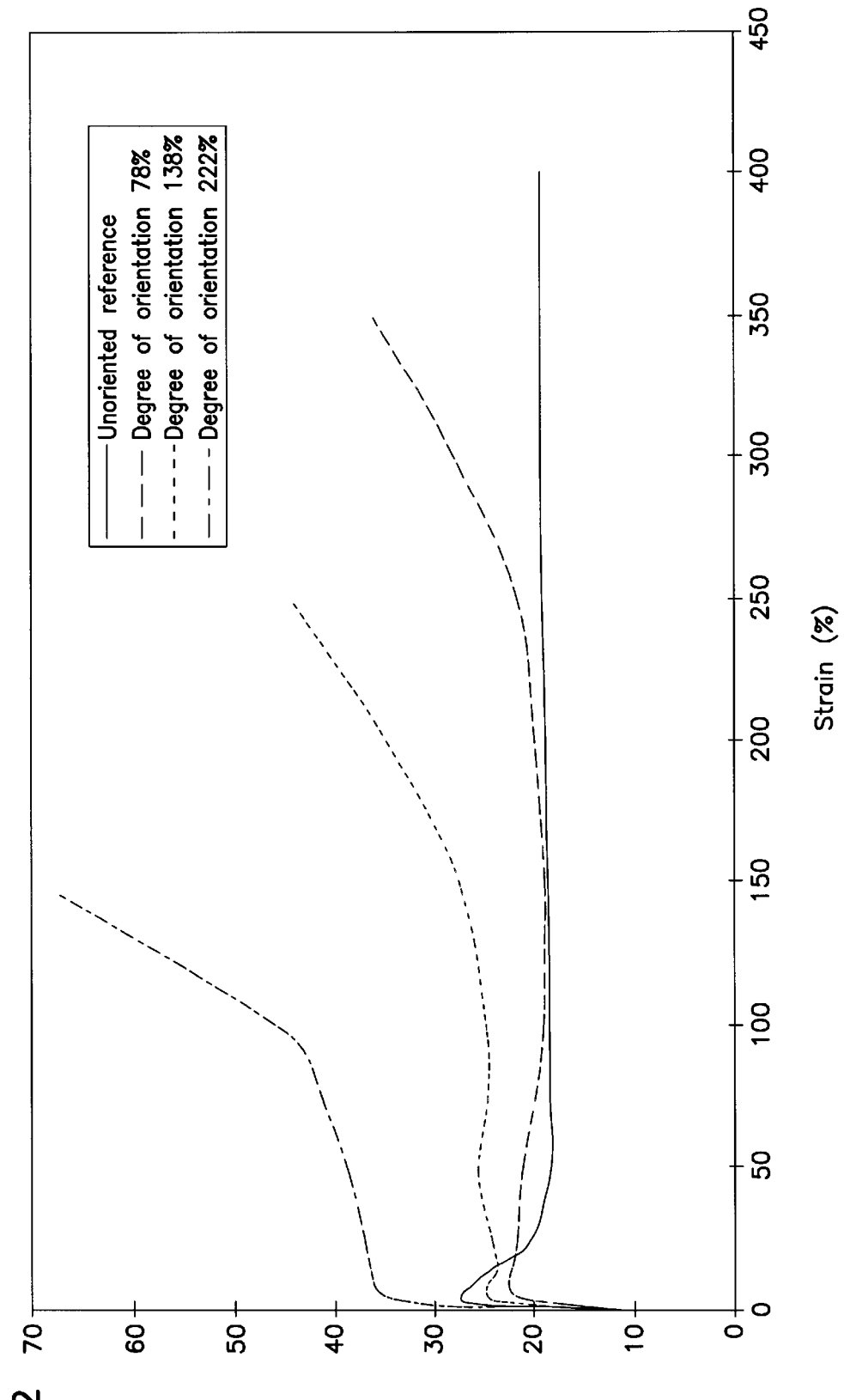

Test samples were taken from an unoriented pipe of HDPE (density 945 kg/m$^3$), which had been radiation-cross-linked to a degree of cross-linking of 49%. By means of a tensile testing apparatus, the test samples were oriented uniaxially at 140° C. and a speed of orientation of about 0.01 s$^{-1}$ to different degrees of orientation which were 78%, 138%, and 222%. An unoriented test sample constituted the reference. The improvement of strength, measured according to ISO 527-2, was then determined and the results are shown in Table 2. As can be noted from FIG. 2, low degrees of orientation result in lower yield stress and higher breaking stress. Above a certain degree of orientation, both yield stress and breaking stress increase. Equivalent tests carried out with test samples of the same HDPE but having a degree of cross-linking of 56% indicated a similar behaviour, a degree of orientation of 244% yielding an improvement of strength of 151%.

Example 5

Test samples were taken from an unoriented pipe of HDPE (density 945 kg/m$^3$), which had been radiation-cross-linked to a degree of cross-linking of 49%. By means of a tensile testing apparatus, the test samples were oriented uniaxially at different temperatures to a degree of orientation of 100%, and the resulting improvement of strength was determined (testing method ISO 527-2). The speed of orientation was about 0.01 s$^{-1}$. The results are stated in Table 2. As appears from the results in Table 2, the orientation can be carried out within a wide temperature range. This demonstrates the difference between the invention and the prior art technique, in which biaxial orientation of plastic pipes has been carried out within a very narrow temperature range. Moreover, Table 2 shows that the improvement of strength is relatively independent of the orientation temperature.

TABLE 2

| Temperature of orientation (° C.) | Improvement of strength (%) |
|---|---|
| 130 | 61 |
| 140 | 62 |
| 150 | 63 |
| 160 | 61 |
| 170 | 59 |

Example 6

Test samples were taken from an uncross-linked and unoriented pipe of HDPE material (density 945 kg/m$^3$) having an outer diameter of 63 mm and a wall thickness of 12.3 mm. The test samples were designated A and B. The test samples were radiation-cross-linked to a degree of cross-linking of 55%. By means of a tensile testing apparatus, the test samples were then oriented uniaxially at 140° C. to a degree of orientation of 120%. The speed of orientation was about 0.01 s$^{-1}$. After orientation, the test samples B were additionally cross-linked to a total degree of cross-linking of 80%. The length of the test samples before orientation was 50 mm and after orientation 110 mm. The shrinkage of the test samples was then determined by placing them on a bed of talc at 140° C. for 15 min., whereupon the length of the test samples was measured. Moreover, the improvement of strength was analysed by tensile testing at 23° C. according to ISO 527-2, the tensile testing being effected on test samples that had not been tested for shrinkage. The improvement of strength was calculated on the basis of the obtained maximum tensile stress on the stress-strain curve in relation to the oriented material. Table 3 indicates the result of the testing for shrinkage and the improvement of strength.

TABLE 3

| Degree of cross-linking | Length before orientation | Length after orientation | Improvement of strength | Length after testing for shrinkage |
|---|---|---|---|---|
| A | 55% | 50 mm | 110 mm | 128% | 51 mm |
| 3 | 80% | 50 mm | 110 mm | 127% | 109 mm |

The results in Table 3 indicate the improved dimensional stability at an increased temperature obtained when using subsequent cross-linking. It should, however, be emphasised that 140° C. is not an example of a normal temperature of use, but is an exceptionally high temperature.

What is claimed is:

1. A method for manufacturing a polyolefin plastic pressurized pipe comprising:
    (a) forming the polyolefin plastic into a pipe;
    (b) partly cross-linking the polyolefin plastic;
    (c) orienting the polyolefin plastic biaxially in the axial and peripheral directions; and
    (d) additionally cross-linking the polyolefin plastic after the biaxial orientation.

2. The method of claim 1, wherein the pressurized pipe is of a multilayered composition, at least one of the layers being the partly cross-linked polyolefin plastic.

3. The method of claim 1, wherein the partly cross-linked polyolefin plastic is selected among ethylene plastic and propylene plastic.

4. The method of claim 1, wherein the peripheral orientation occurs in a temperature range, the upper limit of which is above the crystalline melting point of the polyolefin plastic.

5. The method of claim 1, wherein the additional cross-linking of the polyolefin plastic of the pipe occurs at a temperature above the crystalline melting point of the polyolefin plastic after the peripheral orientation.

6. The method of claim 1, wherein the pressure pipe is intended for transporting a pressurized fluid.

7. The method of claim 6, wherein the fluid water.

* * * * *